Aug. 22, 1961  C. A. THOMAS  2,997,049
MILK PIPE LINE WASHING SYSTEM
Filed Aug. 13, 1957
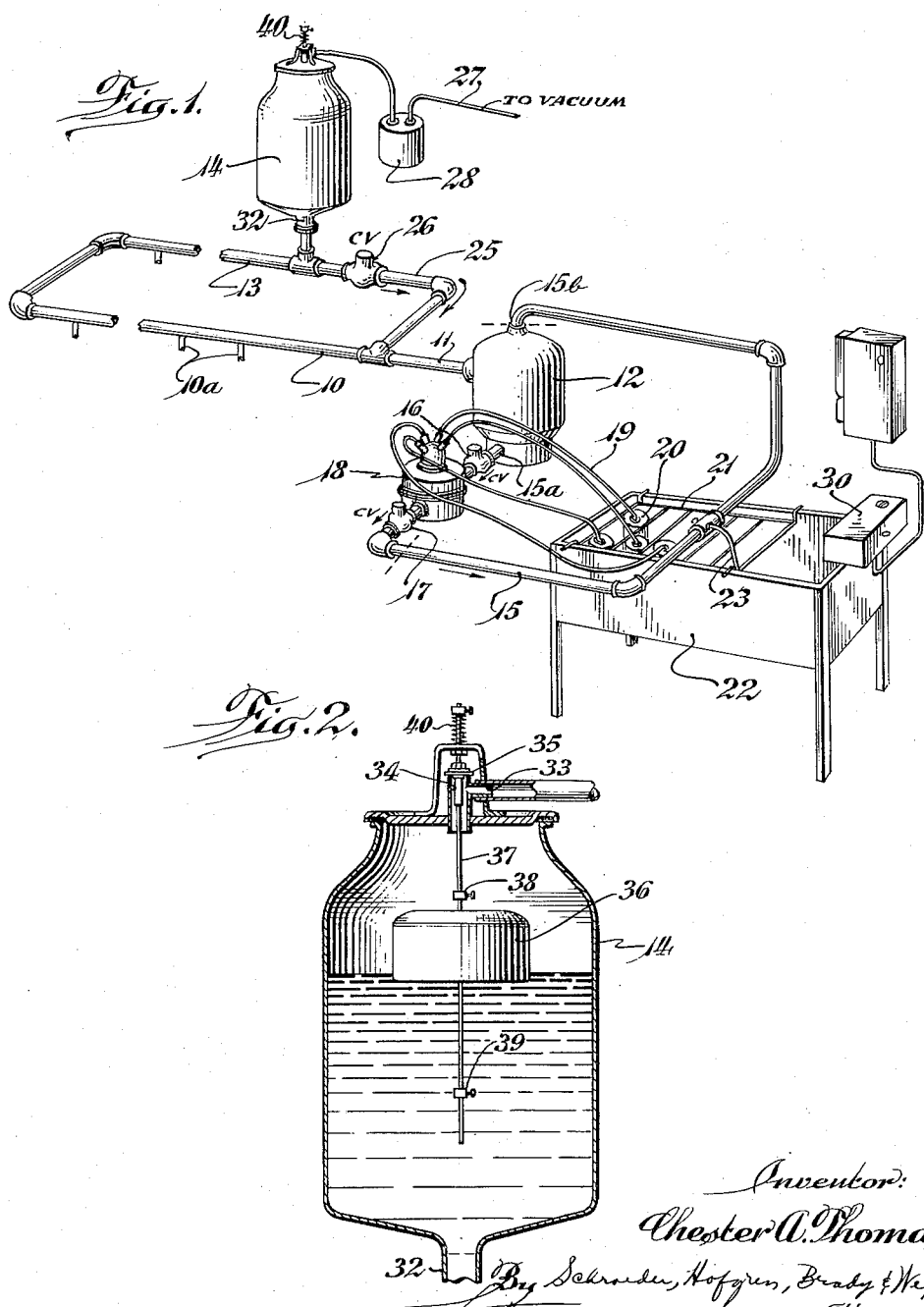

United States Patent Office 2,997,049
Patented Aug. 22, 1961

2,997,049
MILK PIPE LINE WASHING SYSTEM
Chester A. Thomas, Lake Forest, Ill., assignor to Babson Bros. Co., a corporation of Illinois
Filed Aug. 13, 1957, Ser. No. 677,973
10 Claims. (Cl. 134—169)

This invention is concerned with a milk pipe line washing system and more particularly with a system which permits the use of a vacuum circulating system on long lines.

Milking systems incorporating carry-away milk pipe lines through which milk is delivered directly from the cow to storage means, as a bulk tank, which may be located in a milk house some distance from the actual milking area, have been increasing in popularity for the past several years. In the early days of pipe line milking, it was necessary to dissassemble the pipe line and scrub each section by hand. The trend at the present time is to pipe line systems which may be cleaned in place (CIP), see for example the systems disclosed in copending Merritt application, Serial No. 485,773, filed February 2, 1955, now Patent No. 2,915,072, assigned to the assignee of this application, and Thomas application, Serial No. 435,812, filed June 10, 1954, now Patent No. 2,878,819.

In the systems used in the past, vacuum or pumps or a combination thereof have been used to effect the circulation of the washing solution through the pipe line and, in some cases, also through auxiliary milk handling apparatus. Flush type systems which operate solely with vacuum have been limited to use with relatively short pipe lines, as sixty feet in length or less. Longer lines have required the use of pumps to assist in the circulation of the washing solution.

It is a principal object of the present invention to provide a novel, vacuum-operated washing system for long pipe lines.

One feature of the invention is the provision of a washing system including a reservoir for washing solution, a milk pipe line having one end connected with the reservoir, a source of vacuum, vacuum control means interposed between the source of vacuum and pipe line for alternately connecting the pipe line to the source of vacuum and venting it to air, by-pass means between the vacuum control means and the reservoir by means of which washing solution is drawn from the reservoir through the pipe line when the pipe line is connected to the source of vacuum, and is then discharged through the by-pass connection into the reservoir when the pipe line is vented to air. Another feature is that both the pipe line and the vacuum control means are connected with the reservoir through milk handling apparatus so that the washing solution flows in two directions through the milk handling apparatus although it flows essentially in only one direction through the pipe line itself. A further feature is that the washing solution is flushed rapidly in both directions through the auxiliary milk handling apparatus, while it is permitted to back up in the pipe line only enough to obtain the advantages of flush type washing.

A further feature is that the milk handling apparatus includes a milk receiving chamber mounted adjacent to and above the washing solution reservoir. Still another feature is that conduit means are connected between a lower portion and the top portion of said milk receiving chamber, and a connection is provided from the conduit means to the reservoir with a check valve between the point of connection and the lower portion of the receiver, permitting flow only from the lower portion of the receiver to the point of connection so that washing solution is drawn up through the connection and conduit means into the upper portion of the milk receiver when the pipe line is evacuated. Yet a further feature is that the point of connection between the conduit means and the reservoir is the low point of the system.

Another feature of the invention is the method of washing a carry-away milk pipe line and auxiliary milk handling apparatus including drawing washing solution through the auxiliary apparatus and pipe line in one direction and flushing the solution back directly through the auxiliary apparatus.

Further features and advantages will readily be apparent from the following specification and from the drawings, in which:

FIGURE 1 is a perspective view of a system for washing a carry-away milk pipe line embodying the invention; and FIGURE 2 is a vertical sectional view of the vacuum control chamber.

Carry-away milk pipe lines differ greatly in design, length and in the nature of the auxiliary apparatus used with them, depending to a large extent upon the nature of the milking installation with which they are used. For milking parlors where two to six cows are milked at a time, relatively short pipe lines are found, while in stanchion barns which may accommodate seventy-five or a hundred cows, relatively long lines are used; and in either instance the layout of the particular pipe line is largely determined by the physical arrangement of the stalls themselves. For example in a forty cow stanchion barn, the milk pipe line is of the order of 200 feet in length; and prior to the present invention, a washing system for a line of this length required the use of a pump to circulate the washing solution. With the present invention, such lines, and even longer ones may be washed with vacuum alone. The type of milk storage tank available also determines, to a certain extent the nature of the auxiliary apparatus which must be coupled to the pipe line. A common milk storage apparatus is a non-evacuated bulk tank; and with such a tank it is necessary to provide a releaser apparatus for transferring the milk from the evacuated line to the tank. Where the bulk tank is above the milk line or at some distance from it a pump is sometimes necessary. Although the washing system of the present invention is illustrated in the drawings in connection with a particular pipe line layout and certain auxiliary milk handling apparatus, it is to be understood that the invention may be used with other milk line systems.

Turning now to FIGURE 1 of the drawings, the washing system is shown ready for operation. The milk pipe line 10 has a number of nipples 10a mounted thereon through which milk may be introduced into the pipe line from the milker units during milking and one end 11 of the pipe line is connected with a tank or chamber 12 which serves as a milk receiving chamber, part of the releaser apparatus during milking. The other end 13 of pipe line 10 is connected with the bottom of vacuum control chamber or flush tank 14. A conduit 15 has one end 15a connected to the bottom of milk receiving chamber 12 and the other end 15b connected to the top thereof. Interposed in conduit 15 are a pair of check valves 16 and 17 each of which is arranged to permit flow in a single direction, as will be described more fully later. Between the check valves, in conduit 15, is a second chamber 18, smaller than the milk receiving chamber 12, which controls the releaser operation during milking. Attached to the top of chamber 18 is a multiple nipple by means of which a plurality of rubber hoses 19 are connected into the system. These hoses, which may form a part of the milk withdrawal apparatus, are connected to milker units 20, supported on a rack 21 in the washing solution reservoir 22. The milker units 20 are preferably of the type disclosed and claimed in copending Merritt et al. application, Serial No. 517,842, filed June 24, 1955, now Patent No. 2,831,456, and have teat cup units that hang downwardly into the washing solution in reservoir 22. An additional hose 23 is connected to conduit 15 and extends downwardly into the washing solution reservoir so that it reaches substantially to the bottom thereof.

A conduit 25 is connected between the control chamber 14 and milk receiving chamber 12, the conduit joining with the milk pipe line at the end 11 thereof. A check valve 26 in the conduit 25 permits flow therethrough only from the vacuum control chamber to the milk receiving chamber. A source of vacuum, as a vacuum pump and reservoir, is connected through a pipe line, illustrated schematically in the drawing as 27, and a trap 28 to the vacuum inlet at the top of vacuum control chamber 14. As will appear later, vacuum control chamber 14 serves to connect the pipe line 10 alternately to the source of vacuum and to vent the pipe line to air. This in turn effects the desired circulation of the washing solutions through the system.

The pipe line 10 is installed so that the end 13 and vacuum control chamber are adjacent and above milk receiving chamber 12, and the chamber is adjacent and above reservoir 22. Conduit 25 is as short as practicable so that the vacuum control chamber will empty rapidly.

The washing solutions are preferably prepared automatically in reservoir 22 by means of an automatic washing control unit indicated diagrammatically at 30. The construction and operation of the washing control unit is disclosed fully in copending Merritt application, Serial No. 485,773, filed February 2, 1955. Of course, the washing solutions may, if desired, be mixed by hand.

Vacuum control chamber 14 has a single liquid inlet and outlet 32, at the bottom thereof, and a vacuum connection 33 at the top. Adjacent the vacuum connection 33 is a vent opening 34, closed by a valve 35 which is controlled by a float 36 slidably mounted on valve stem 37 between a pair of collars 38 and 39. When the control chamber 14 is empty, the float 36 rests on lower collar 39, the weight of the float overcoming the force of valve bias spring 40 seating valve 45 over the vent opening 34. As liquid is drawn into the chamber 14 by the action of the vacuum, the float rises, as shown in the drawing. Valve 35 remains closed, however, as the force of the vacuum acting on the undersurface thereof is sufficient to overcome the effect of spring 40. When the float strikes the upper collar 38, valve 35 is forced open venting the vacuum and allowing the liquid in the chamber to flow out. When float 36 again strikes lower collar 39, valve 35 is closed and the action is repeated.

The operation of the system proceeds generally as follows. When vacuum is applied to the pipe line 10 through vacuum control chamber 14, washing solution is drawn through milker units 20 and hoses 19, and through hose 23, into conduit 15. The washing solution drawn through the milker units and hoses 19 is caused, by the arrangement of check valves 16 and 17, to flow through valve 17, around conduit 15 and into the top of milk receiving chamber 12 through 15b of the conduit. When the milk receiving chamber 12 is filled, the washing solution flows into pipe line 10 filling it and thence into vacuum control chamber 14.

After sufficient washing solution has been drawn through the system to fill the vacuum control chamber to the desired level, as determined by the setting of collar 38, the vacuum is vented and the washing solution drains from the chamber. Most of the washing solution flows directly from chamber 14 through check valve 26 and by-pass conduit 25 back into milk receiving chamber 12. From the milk receiving chamber the washing solution flows, for the most part, through end 15a of conduit 15, check valve 16, hoses 19 and milker units 20 back into the reservoir. A small amount of the washing solution may flow through check valve 17 and hose 23 into the reservoir while some may also flow through the upper opening of chamber 12 and end 15b of conduit 15 to hose 23, depending upon the physical relationship of the elements of the system. A small amount of the washing solution also flows in a reverse direction through the pipe line itself, although this will be much less than the amount that flows through check valve 26 and conduit 25. The lower collar 39 is set so that a small amount of washing solution is retained in the chamber to prevent air from getting into the line. For example, where the vacuum control tank 14 has a capacity of the order of seven gallons the upper collar is set to vent the system with about six gallons of solution in the chamber, and about five and a half gallons are permitted to flow back out of the chamber. Of the five and a half gallons which flow back from the chamber into the reservoir on each cycle of operaton about one-half gallon flows backwardly through the pipe line 10. With a pipe line having a diameter of one and one-half inches, which is a standard size in milking systems, this amounts to a movement of the solution of about five to six feet along the line. This serves to agitate the solution in the pipe line itself and to secure for the washing system all of the advantages of a stratight flush washing system. In addition, as the major portion flows directly from tank 14 through by-pass conduit 25 and the milk handling equipment back to reservoir 22, the system cycles rapidly so that the washing operation is carried on in a reasonably short time and without permitting the washing solutions to cool.

Another advantage of this system is that the milk receiving chamber 12, chamber 18 and milker units 20 are always maintained completely full of washing solution, as the system itself is always full, except when draining, regardless of the number of units being washed. This should be contrasted with a pump operated washing system in which the number of milker units which are kept full of washing solution is limited by the capacity of the pipe line. For example, with an inch and a half pipe line, a pump will do a good job of washing only five to eight milker units.

Relatively few changes are necessary to convert the system for milking. Vacuum control chamber and by-pass conduit 25 are removed and the connections to ends 11 and 13 of the pipe line are capped. Auxiliary conduit 15 is removed, the outlet of check valve 17 connected to a bulk tank (not shown) and the top of milk receiver 12 connected to the source of vacuum 27.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. A milk pipe line washing system, comprising: a reservoir for washing solution; milk handling apparatus in communication with said reservoir; a milk pipe line having one end connected through said milk handling apparatus with said reservoir; a source of vacuum; vacuum control means interposed between said source of vacuum and said pipe line for alternately connecting the pipe line to the source of vacuum and venting it to air; and by-pass means connected between said vacuum control means and said reservoir, through said milk handling apparatus, washing solution being drawn from the reservoir through the milk handling apparatus and the pipe line when the pipe line is connected to the source of vacuum, and washing solution being discharged directly through said by-pass means and milk handling apparatus into said reservoir through said by-pass means when the pipe line is vented to air.

2. A milk pipe line washing system, comprising: a reservoir for washing solution; milk handling apparatus in communication with said reservoir; a milk pipe line having one end connected with said reservoir through said milk handling apparatus; a source of vacuum; vacuum control means interposed between said source of vacuum and said pipe line for alternately connecting the pipe line to the source of vacuum and venting it to air; means connecting said vacuum control means with said reservoir, through said milk handling apparatus; and a check valve in said last mentioned connecting means, permitting flow of washing solution only from said vacuum control means through said milk handling apparatus to said reservoir, washing solution being drawn from the reservoir through the milk handling apparatus and pipe line when the pipe line is connected to the source of vacuum and being discharged through said milk handling apparatus into said reservoir when the pipe line is vented to air.

3. A milk pipe line washing system, comprising: a reservoir for washing solution; milk handling apparatus in communication with said reservoir; a milk pipe line having one end connected through said milk handling apparatus with said reservoir; a source of vacuum; vacuum control means interposed between said source of vacuum and said pipe line for alternately connecting the pipe line to the source of vacuum and venting it to air, said vacuum control means being located adjacent to and above said reservoir; a connection between said vacuum control means and said reservoir, through said milk handling apparatus; and a check valve in said last mentioned connection, permitting flow only from said vacuum control means to said reservoir, washing solution being drawn from the reservoir through the milk handling apparatus and the pipe line when the pipe line is connected to the source of vacuum and washing solution being discharged into the reservoir through said last mentioned connection and said milk handling apparatus when the pipe line is vented to air.

4. A milk pipe line washing system of the character described in claim 2, wherein said milk handling apparatus includes milker units having teat cup assemblies hanging in solution in said reservoir.

5. A milk pipe line washing system, comprising: a reservoir for washing solution; milk handling apparatus, including a milk receiving chamber, in communication with said reservoir; a milk pipe line having one end connected with said reservoir through said milk receiving chamber; a source of vacuum; vacuum control means interposed between said source of vacuum and the other end of said milk pipe line for alternately connecting the pipe line to the source of vacuum and venting it to air; means connecting said vacuum control means with said reservoir, through said milk receiving chamber; and a check valve in said last mentioned connecting means, permitting flow of washing solution only from said vacuum control means through said milk receiving chamber to said reservoir, washing solution being drawn from the reservoir through the milk receiving chamber and pipe line when the pipe line is connected to the source of vacuum and being discharged through said milk receiving chamber into said reservoir when the pipe line is vented to air.

6. A milk pipe line washing system, comprising: a reservoir for washing solution; milk handling apparatus, including a milk receiving chamber, in communication with said reservoir; conduit means external of said milk receiving chamber and connected between a lower portion and an upper portion thereof; first means connecting said conduit means to said reservoir; a check valve in said conduit means between said first connecting means and the connection of the conduit means to the lower portion of the milk receiving chamber; a source of vacuum; vacuum control means interposed between said source of vacuum and said pipe line for automatically connecting the pipe line to the source of vacuum and venting it to air; second means connecting said vacuum control means with said reservoir through said milk receiving chamber; and a check valve in said second connecting means, permitting flow of washing solution only from said vacuum control means through said milk handling apparatus to said reservoir, washing solution being drawn from the reservoir through said first connecting means, conduit means, milk receiving chamber and pipe line when the pipe line is connected to the source of vacuum and being discharged through said second connecting means, milk receiving chamber, conduit means and second connecting means into said reservoir when the pipe line is vented to air.

7. A milk pipe line washing system of the character described in claim 6, wherein said first connecting means is connected to said conduit means at the low point of the system.

8. A milk pipe line washing system, comprising: a reservoir for washing solution; a milk pipe line; a receiving chamber adjacent and above said reservoir, and connected to one end of said pipe line at a point below the top of said chamber; a second chamber; first conduit means connecting said second chamber to a lower portion of said receiving chamber; a first check valve in said first conduit means, permitting flow from said receiving chamber to said second chamber; second conduit means connecting said second chamber and the top of said receiving chamber; milking apparatus supported in said reservoir; means connecting said milking apparatus with said second chamber; a source of vacuum; a vacuum control chamber located adjacent and above said receiving chamber and connected between the end of said milk pipe line remote from said one end and said source of vacuum; means connecting said vacuum control chamber directly with said one end of said pipe line; and a second check valve in said last mentioned connecting means, permitting flow from said vacuum control chamber through said receiving chamber, first check valve, second chamber and milk receiving apparatus into said reservoir.

9. A milk pipe line washing system, comprising: a reservoir for washing solution; a milk pipe line; a receiving chamber adjacent and above said reservoir, and connected to one end of said pipe line at a point below the top of said chamber; a second chamber; first conduit means connecting said second chamber to a lower portion of said receiving chamber; a first check valve in said first conduit means, permitting flow from said receiving chamber to said second chamber; second conduit means connecting said second chamber and the top of said receiving chamber; a second check valve in said second conduit means, permitting flow from said second chamber to said receiving chamber; a connection between said second conduit means, at a point between the second check valve and the receiving chamber, and said reservoir; milking apparatus supported in said reservoir; means connecting said milking apparatus with said second chamber; a source of vacuum; a vacuum control chamber located adjacent and above said receiving chamber and connected between the end of said milk pipe line remote from said one end and said source of vacuum; means connecting said vacuum control chamber directly with said one end of said pipe line; and a third check valve in said last mentioned connecting means, permitting flow from said vacuum control chamber through said receiving chamber, first check valve, second chamber and milk receiving apparatus into said reservoir.

10. Milk pipe line washing system of the character described in claim 9, wherein the point of said second conduit means between the second check valve and the receiving chamber at which connection is made to the reservoir is the low point of the system.

(References on following page)

References Cited in the file of this patent

UNITED STATES PATENTS

| | | |
|---|---|---|
| 695,323 | Mittinger | Mar. 11, 1902 |
| 1,194,542 | Raymond | Aug. 15, 1916 |
| 1,645,356 | Shurts | Oct. 11, 1927 |
| 2,078,740 | Stahl | Apr. 27, 1937 |
| 2,233,852 | Schmitt | Mar. 4, 1941 |
| 2,418,751 | Brewer | Apr. 8, 1947 |
| 2,733,667 | Hill | Feb. 7, 1956 |
| 2,800,134 | Merritt | July 23, 1957 |
| 2,816,558 | Fasth | Dec. 17, 1957 |